United States Patent
Baksh et al.

[11] Patent Number: 5,565,018
[45] Date of Patent: Oct. 15, 1996

[54] OPTIMAL PRESSURE SWING ADSORPTION REFLUXING

[75] Inventors: Mohamed S. A. Baksh; Frank Notaro, both of Amherst, N.Y.

[73] Assignee: Praxair Technology, Inc., Danbury, Conn.

[21] Appl. No.: 501,681

[22] Filed: Jul. 12, 1995

[51] Int. Cl.$^6$ .................................................. B01D 53/053
[52] U.S. Cl. ........................... 95/100; 95/103; 95/105; 95/130; 96/130; 96/133
[58] Field of Search .................. 95/95–98, 100–105, 95/130; 96/130, 133

[56] References Cited

U.S. PATENT DOCUMENTS

| | | | |
|---|---|---|---|
| 2,944,627 | 7/1960 | Skarstrom | 95/26 |
| 3,142,547 | 7/1964 | Marsh et al. | 95/100 |
| 3,430,418 | 3/1969 | Wagner | 95/100 |
| 3,788,036 | 1/1974 | Lee et al. | 95/101 |
| 3,977,845 | 8/1976 | Walter | 95/130 X |
| 4,015,956 | 4/1977 | Münzner et al. | 95/96 |
| 4,194,890 | 3/1980 | McCombs et al. | 95/98 X |
| 4,263,018 | 4/1981 | McCombs et al. | 95/98 X |
| 4,340,398 | 7/1982 | Doshi et al. | 95/103 |
| 4,350,500 | 9/1982 | Esselink | 95/100 |
| 4,512,778 | 4/1985 | Simonet et al. | 95/100 |
| 4,512,779 | 4/1985 | Haÿ | 95/100 |
| 4,781,735 | 11/1988 | Tagawa et al. | 55/26 |
| 4,816,039 | 3/1989 | Krishwamurthy et al. | 55/26 |
| 4,848,985 | 7/1989 | Sadkowski | 95/100 |
| 5,250,088 | 10/1993 | Yamaguchi et al. | 95/98 |
| 5,258,059 | 11/1993 | Yamaguchi et al. | 95/100 |
| 5,370,728 | 12/1994 | LaSala et al. | 95/101 |
| 5,415,683 | 5/1995 | Leavitt | 95/101 |

*Primary Examiner*—Robert Spitzer
*Attorney, Agent, or Firm*—Alvin H. Fritschler; Robert J. Follett

[57] ABSTRACT

Segregated external gas storage tanks are used to store gases of varying purity for use in the purge and pressure equalization and product repressurization steps of pressure swing adsorption operations, thereby enabling the bed size factor and the power requirements of pressure swing adsorption-gas separation operations to be significantly reduced.

19 Claims, 4 Drawing Sheets

OPTIMAL PRESSURE SWING ADSORPTION REFLUXING

BACKGROUND OF THE INVENTION

1. Field of the Invention

The invention relates to pressure swing adsorption processing for the separation of gas mixtures. More particularly, it relates to enhanced efficiency in the use of pressure swing adsorption processing for the large scale production of oxygen from air.

2. Description of the Prior Art

Pressure swing adsorption (PSA) processes are well known for use in air or other gas separation operations. Such PSA processing generally includes a processing sequence comprising: (1) adsorption, with feed gas being passed to the feed end of an adsorbent bed at an upper adsorption pressure for the selective adsorption of a more readily adsorbable component, and with discharge of a less readily adsorbable component from the product end of the bed; (2) desorption, with depressurization of the adsorbent bed from the upper adsorption pressure to a lower desorption pressure, and with discharge of the more readily adsorbable component from the bed; (3) purging, by the passing of a purge gas to the adsorbent bed to facilitate the removal of said more readily adsorbable component from the adsorbent bed; (4) repressurization, with the pressure of the bed being increased from its lower desorption pressure to the upper adsorption pressure, and (5) passage of additional quantities of feed gas to the adsorbent at the upper adsorption pressure in step (1) as the processing sequence is continued on a cyclic basis. Such PSA processing is disclosed in the Skarstrom patent, U.S. Pat. No. 2,944,627, and a wide variety of processing variations are known in the art for the modification of the basic adsorption/depressurization/purge/repressurization sequence for various purposes.

Wagner, U.S. Pat. No. 3,430,418, discloses an adsorption system having at least four adsorbent beds wherein, as part of the desorption step in each bed, void gas, generally comprising the less readily adsorbable component, is released from the product-end of the bed and passed to the product end of another bed in the system initially at a lower pressure to equalize the pressure between the beds at an intermediate pressure level. Following such cocurrent depressurization-pressure equalization step, the bed is countercurrently depressurized from the intermediate pressure to a lower pressure with release of more readily adsorbable component from the feed end of the bed. The Doshi patent, U.S. Pat. No. 4,340,398, discloses a PSA process using three or more adsorbent beds, wherein void gas is passed from the product end of a bed, not directly to another bed, but to a storage tank from which gas is passed to a bed for repressurization purposes. Likewise, Krishnamurthy et al., U.S. Pat. No. 4,816,039, discloses the use of one or more storage tanks in a two-bed PSA system. Following direct pressure equalization between two beds, the patent discloses the passage of additional void gas from the product end of the bed being depressurized to at least one storage tank. Following regeneration of the bed at the lower desorption pressure, the void gas is returned from the tank to the bed for pressure equalization purposes. Recovery of the less readily adsorbable component product gas is enhanced due to a decrease in the loss of void space gas during subsequent countercurrent depressurization and purge steps.

In the Yamaguchi et al. patent, U.S. Pat. No. 5,258,059, a PSA process and system are described in which at least three adsorbent beds are employed, with direct bed-to-bed pressure equalization being carried out during the depressurization/repressurization portion of the processing cycle. A holding column, i.e., a segregated storage tank, of a feed-in/feed-out sequence returning type, is used for storing void space gas recovered during a cocurrent depressurization step of the cycle, with release of gas from the product end of the bed. This void space gas is then used for purging the adsorbent bed during the bed regeneration portion of the cycle. The holding column is specifically designed to prevent gas from mixing therein, i.e., an impurity concentration gradient is maintained in the holding column.

In currently used PSA cycles, the adsorbent bed undergoing a pressure equalization-pressure rising step receives product gas with decreasing purity levels from another bed currently on the make product step, i.e., the cocurrent depressurization portion of the overall make product step that includes the feed-upper adsorption pressure step and the cocurrent depressurization step. Consequently, at the end of this pressure equalization-pressure rising step, the lowest purity gas is at the product end of the bed. In addition, the gas used for purging the adsorbent bed is of decreasing purity when it is obtained from another bed currently on the make product step. If the purge gas were obtained from a product storage tank, a constant purity purge gas would be available.

It should also be noted that, in order to maintain desired product purity in prior art PSA cycles, the production and pressure equalization-falling steps must be terminated much earlier than the time required before the impurity front of more readily adsorbable component breaks through from the product end of the bed. As a result, the adsorptive capacity of the adsorbent bed is not fully utilized. Furthermore, using less readily adsorbable gas of decreasing purity during the purging, pressure equalization-rising, and repressurization steps, results in additional contamination of the product end of the bed, due to the use of the lowest purity product gas at the end of these bed refluxing steps. This added contamination of the product end of the bed results in a significant reduction in product purity in the early stage of the make product step, and causes a decrease in the average purity of the less readily adsorbable product gas. In addition, by using product gas of decreasing purity, the spreading of the mass transfer zone within the bed is undesirably enhanced. Furthermore, in order to contain the mass transfer zone and maintain product purity, more adsorbent material is required, resulting in a higher bed size factor, and a more costly overall PSA process.

In a typical prior art pressure equalization cycle, the PSA process comprises the following sequence:

(I) Feed (air) pressurization (FP) to an upper adsorption pressure level.

(II) Adsorption and gross product production (AD).

(III) Depressurization-Equalization falling (EQ) (cocurrent), wherein the gas is transferred to another bed that is undergoing the equalization rising step (EQ).

(IV) Depressurization/Evacuation (EV) to waste (countercurrent) at a lower desorption pressure.

(V) Depressurization/Evacuation to waste while purging (PG) (countercurrently).

(VI) Equalization rising step (EQ), wherein the gas is supplied by another bed undergoing the equalization falling step (step III).

In another prior art product pressurization cycle, the gas required for purging and repressurization, i.e., refluxing, comes from another bed undergoing the adsorption/production step. In this mode of operation, the purge gas is obtained from another bed at an early stage of the adsorption step, with product gas being obtained from the bed during a later stage of said adsorption step. Since the effluent purity decreases with time as the impurity front of more readily adsorbable component approaches a breakthrough condition, a higher purity gas is used for purging than for product repressurization. Ideally, however, it would be desirable to use the lowest purity gas at the start of the purging step, followed by the use of product gas of increasing purity in the latter stages of such purging step. However, due to the mode of operation in such prior art PSA cycles, it is very difficult to arrange for the use of the highest purity gas last. Consequently, in order to maintain a given product purity, the percentage of the total cycle time allocated to the production of the less readily adsorbable component product gas is reduced, with a concomitant and undesired increase in bed size factor and power consumption.

In order to use the lowest purity gas at the start of the purge step, followed by product gas of increasing purity during the rest of the refluxing steps, it is necessary to produce multiple purity products, so that the highest purity gas can be used last. However, during the production step at the upper adsorption pressure, the purity of the gas removed from the product end of the bed decreases with time. Thus, the purity of the gas recovered is initially high and gradually decreases to a lower level. Thus, there is a need in the art for a means to reverse this purity order, and for the production of multiple purity products.

Since multiple purity products are required for refluxing and bed repressurization, the PSA cycle becomes inherently more complicated. In one approach to this problem, the use of two storage tanks has been considered, so that, at different times in the production step (b), the effluent gas can be directed to different storage tanks. In such a mode of operation, the time allocated for each storage tank to receive effluent gas controls the quantity of each purity gas collected. However, the use of more than one storage tank adds to the complexity and the capital cost of the PSA process, particularly since additional valves and associated piping are required thereby.

Alternatively, a single segregated storage tank can be used to store multiple purity products. In such a tank, no mixing of the product gas is allowed, and one end contains the lowest purity gas and the other end contains the highest purity gas. Such segregated storage tanks can be of the type described in the Yamaguchi et al. patent referred to above or can be a tank packed with layers of adsorbent(s) or inert materials, or simply an empty tank containing baffles to suppress mixing.

It will be appreciated from the above that there is a need in the art for the development of PSA processing improvements to enable gases of increasing purity to be used in purging at lower desorption pressure, pressure equalization-rising, and bed repressurization to the upper adsorption pressure. Such improvements would serve to lower the bed size factor and the power consumption required as compared to the requirements of prior art PSA processing cycles.

It is an object of the invention, therefore, to provide a process for using gas of increasing purity in various steps of bed regeneration to lower the bed size factor and power consumption requirements of a PSA operation.

It is another object of the invention to provide a process in which gas of increasing purity can be used throughout the purging, pressure equalization-rising and pressurization steps of a PSA cycle instead of the decreasing purity of direct bed-to-bed gas passage.

With these and other objects in mind, the invention is hereinafter described in detail, the novel features thereof being particularly pointed out in the appended claims.

SUMMARY OF THE INVENTION

Gases are stored in segregated storage tanks so that such gas of increasing purities can be employed during refluxing, i.e. the purging, pressure equalization-rising, and product repressurization portions of a PSA processing sequence prior to final feed gas repressurization.

BRIEF DESCRIPTION OF THE DRAWINGS

The invention is further described with reference to the accompanying drawings in which.

DETAILED DESCRIPTION OF THE INVENTION

The objects of the invention are accomplished by the use of one or more segregated external gas storage tanks in the practice of PSA processes and systems. Gases withdrawn from an adsorbent bed are stored in a well defined order for use in purge and pressure equalization-rising and product gas repressurization steps. For example, in the purge step, the invention enables product gas of lowest purity to be used initially, followed by the use of product gas of increasing purity for the latter stages of the purging operation. Similarly, at the beginning of the pressure equalization-rising step, the lowest purity product gas from the segregated storage tank is used initially, with gas of increasing purity being used at latter portions of the pressure equalization-rising step. In this regard, it should be noted that, in the corresponding pressure equalization-falling, make product step, the gas withdrawn from the product end of a bed during cocurrent depressurization thereof and passed to the segregated gas storage tank will have decreasing purity levels. Such stored product gas will be withdrawn from the storage tank in reverse order, with gas purity increasing during withdrawal for passage to a bed undergoing refluxing, i.e. purge and/or the pressure equalization-rising step and/or product repressurization. It will be appreciated that, since multiple purity products are employed in the practice of the invention, the withdrawal of gases of lower purities from the product end of a bed during the depressurization thereof can be tolerated, and the adsorptive capacity of the bed can be more fully utilized, enabling the adsorption step to be terminated just prior to breakthrough of the more readily adsorbable component at the product end of the bed.

The incorporation of the segregated storage tank in the PSA processing sequence of the invention enables greater processing flexibility and processing efficiency to be achieved as compared to prior art PSA cycles. In particular, the inclusion of segregated gas storage tank in the processing sequence of the invention, for any given PSA cycle, results in a lower or comparable Bed Size Factor (BSF), and a 5–15% power reduction compared with the same PSA cycle without the use of the segregated external storage tank as described and claimed herein. By contrast, prior art PSA cycles employ, for example, gas of constant purity, or gas of decreasing purity, as obtained directly from another bed in the PSA system, for refluxing, i.e., for purge, and pressure equalization-rising. For inclusion of the segregated storage tank, as employed in the practice of the invention, enables the production of multiple purity gas in various quantities for a refluxing, as well as for supplying, if desired, quantities of each purity gas to meet variable product demands of the consumers of gas from the PSA system.

It will be understood that, since various amounts of multiple purity products are employed, the time allocated, and the process control of the gas production step, is important in the operation of the PSA cycle of the invention. In addition, those skilled in the art will appreciate that various modifications of the PSA processing steps will desirably be employed, in the practice of the invention, as a result of the use of a segregated external storage tank. Such modifications may include the overlapping of various process steps to reduce total cycle time, the choice of operating conditions employed, e.g., the upper adsorption pressure, the lower desorption pressure, the pressure at the end of the pressure equalization step, and the amounts of multiple purity products used for refluxing, as well as the time period allocated for each step, and the order in which the steps of the overall PSA cycle are carried out.

Figure 1:
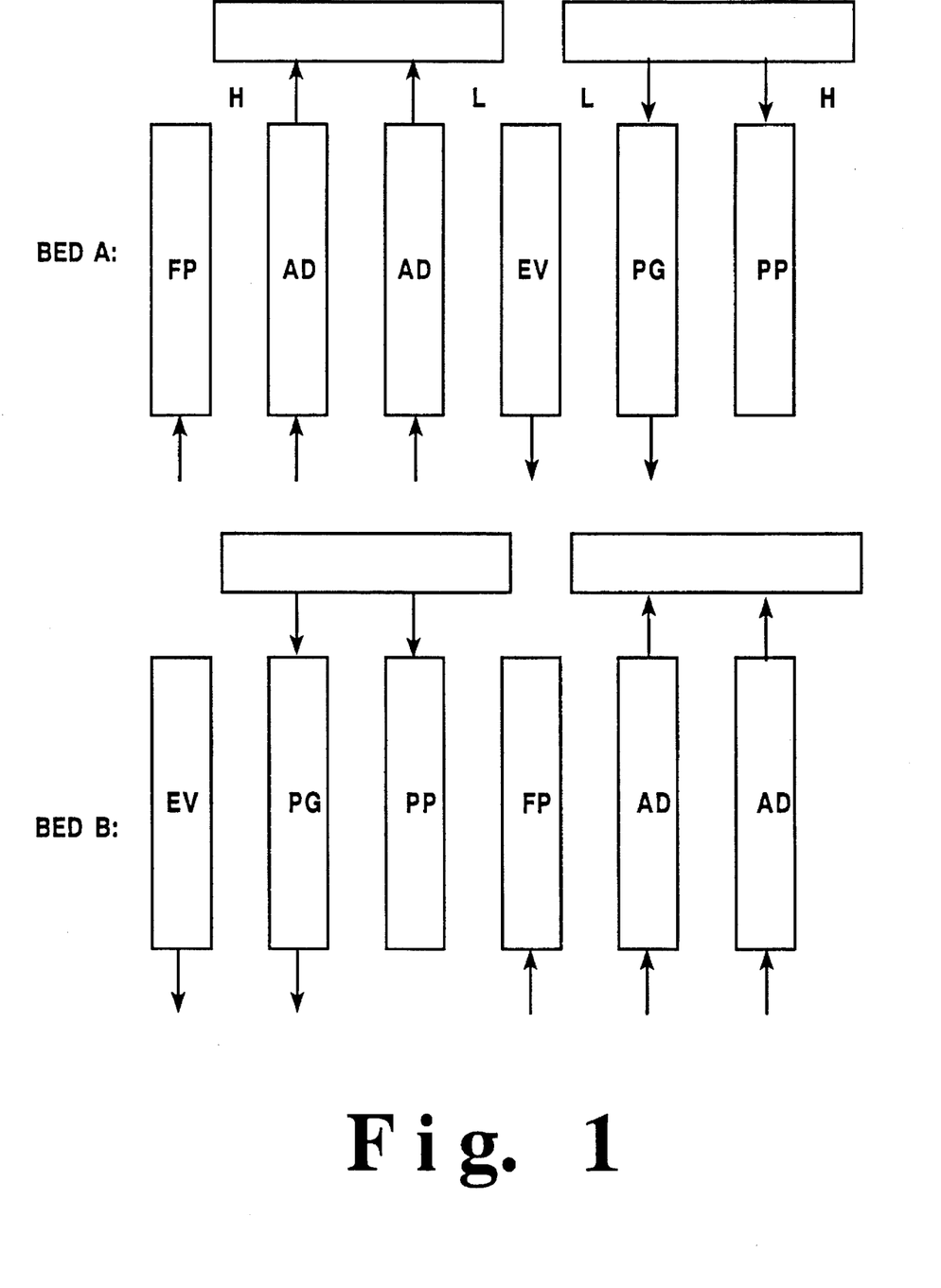
FIG. 1 is a process flow chart illustrating the practice of the invention with a segregated tank and two adsorbent beds in a particular embodiment of the invention.

In the embodiment of the invention illustrated in FIG. 1 of the drawings, the segregated tank is used in a product pressurization cycle as shown. Multiple purity products are produced and can be used in a well defined order for refluxing during the regeneration and repressurization of the adsorbent bed.

In the practice of the invention in the embodiment illustrated in said FIG. 1, the following steps are carried out separately or in any desired combination:

(a) The feed (e.g., air) is introduced at one end of the adsorbent bed for pressurization (FP) from an intermediate pressure level desirably of 0.60–1.0 atm. (1.0 atm.=14,696 psi), and preferably between 0.7–0.9 atm., to an upper pressure level, selected between 1.30–1.50 atm., and preferably between 1.37–1.52 atm. A lower desorption pressure level for the process of between 0.30–0.39 atm., and preferably between 0.34–0.37 atm is desirably employed in mid embodiment.

(b) The pressure during the production step (AD) could be at rising pressure from the intermediate pressure level of 0.60–1.0 atm. (the pressure at the end of the product pressurization step) to the adsorption pressure of 1.30–1.50 atm. Alternatively, feed pressurization without bleed off occurs during feed pressurization (FP) to reach the adsorption pressure, after which a control valve opens to produce product. In this latter case, the pressure during the production step is at constant pressure. The effluent gas stream is directed into a segregated storage tank, wherein multiple purity products are stored without significant mixing, or the effluent stream is directed to the respective product storage tanks at different times in the production step.

(c) The feed input is terminated, and the adsorbent bed is depressurized cocurrently (henceforth referred to as the equalization falling step, which is not shown in FIG. 1), to recover the void gas and light component that co-adsorbed on the adsorbent, or the adsorption step is continued as shown in FIG. 1. The pressure in the former case, decreased from the adsorption pressure (1.30–1.50 atm.) to about 1.0 atm. This gas could be stored in another segregated storage tank, or could be fed directly to the same segregated storage tank used in the previous step.

(d) Countercurrent depressurization/evacuation (EV) down to the low pressure level of about 0.35 atm.

(e) Purging (PG) the bed countercurrently, wherein the purge gas is returned to the bed in the order of increasing purity, starting with the lowest (L) purity product at the beginning of the purge step.

(f) Product Pressurization, countercurrently with product gas of increasing purity, from the low pressure of 0.35 atm., to an intermediate pressure of 0.60–1.0 atm. At the end of this step, the highest (H) purity gas from the segregated storage tank was used.

The basic features of the invention are illustrated by describing the operation of a two-bed PSA process. However, it is anticipated that systems having only one bed or having more than two beds can also be employed in the practice of this invention. FIG. 1 is a schematic diagram of a two-bed PSA process consisting of two adsorption beds, feed compressor(s) or interconnected lines and valves.

Figure 2:
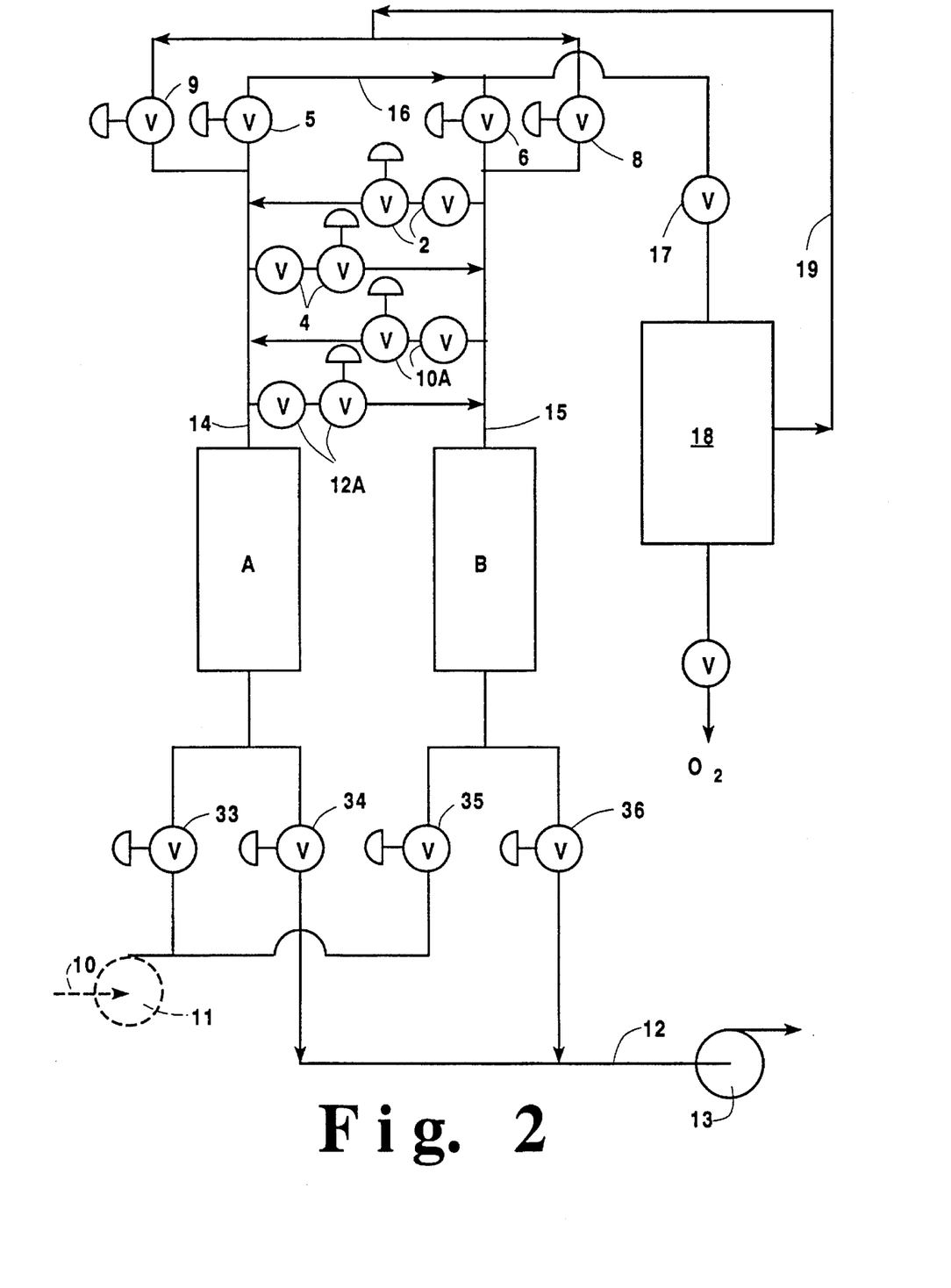
FIG. 2 is a process flow diagram of a two bed PSA system using one segregated external gas storage tank in the process illustrated in FIG. 1.

The practice of the invention in the embodiment of FIG. 1 is further illustrated in FIG. 2 of the drawings. As shown therein, the PSA system consists of two adsorbent beds, i.e., A and B filled with adsorbents, each having inlets 33 and 35, and outlets 5 and 6. The feed inlets 33 & 35 are connected to an air conduit 10 by a blower machine or compressor 11; whereas, the exhaust valves 34 and 36 are connected to conduit 12 incorporating a vacuum pump 13. The outlets 14 and 15 communicate with valves 5 and 6 to a production conduit 16 through a control valve 17 that connects a segregated product storage tank 18. Valves 10A and 12A allow the two beds to communicate, when a conventional purge step is used. For example, valve 12A when opened, allows a portion of the product gas from bed A to supply a purge stream to bed B. Similarly, valve 10A when opened, allows a portion of the product gas from bed B to supply the purge gas to bed A. However, in the practice of this invention, all of the purge gas comes from the segregated storage tank 18, in the order of increasing purity. Thus, at the start of the purge step, the lowest (L) purity gas is used, followed by increasing purity during the step.

While the outlet conduits 14 and 15 are connected to each other by valves 2 and 4 to allow for direct bed-bed pressure equalization, it will be understood however, in the practice of this invention, no direct bed-bed pressure equalization is used. Thus, all of the pressure equalization falling gas goes to the segregated storage tank 18 in the order of decreasing purity, and is then returned to an adsorbent bed, in the order of increasing purity, for purging and pressurization of the bed at the product end.

All the valves in the diagram are operated electronically via a computer system and program logic. Conduit 19 is connected to the segregated product storage tank, and supplies all of the refluxing gas, in the order of increasing, purity, for the purge and product pressurization steps. For example, when reflux gas is required for bed A, valve 9 is opened to allow product gas from the segregated storage tank 18 to enter said bed, in the order of increasing purity. Similarly, valve 8 is opened when bed B needs refluxing gas.

Referring to said FIGS. 1 and 2, the two-bed process is described below to illustrate the opening and closing of the valves for each step of the cycle.

Step 1 (FP): Feed (air) is introduced at one end of the bed. In the case of bed A, valve 33 is opened to allow feed gas to enter the bed. During this time, valve 36 is opened and the other bed B is undergoing evacuation.

Step 2 (AD): Gross product make step. Valves 33 and 5 are opened. Control valve 17 program logic dictates when this valve will open to allow product gas to enter the segregated product storage tank 18. For instance, if constant pressure is required during the make product step, then control valve 17 only opened when the bed reached a predetermined pressure level to allow product gas to enter the segregated product storage tank 18. During the make product step (step 2), valves 8 and 36 are opened. Thus, bed B is undergoing the purge step and evacuation simultaneously. The gas required for the purge step was received from the segregated storage tank, in the order of increasing purity, starting with the lowest purity gas at the beginning of the step.

Step 3 (AD or EQ): Continuation of the adsorption step (AD), wherein, valves 33 and 5 remained opened, or closed valve 33 and allow bed A to undergo a cocurrent depressurization step (EQ). For either of the two cases, additional product gas is directed to the segregated product storage tank 18. During this time valve 36 is closed, and valve 8 remained opened, so that product gas is obtained from the segregated product storage tank, in the order of increasing purity, for product pressurization of bed B.

Step 4 (EV): Valve 34 is now opened to evacuate bed A countercurrently, and valve 35 is opened so that bed B undergoes feed pressurization at one end of the bed.

Step 5 (PG): Valve 9 is now opened, so that bed A receives product gas for purging, in the order of increasing purity, from the segregated product storage tank. During this time, valve 34 remained in the opened position for continued evacuation. During this time, valves 35 and 6 are opened so that bed B is in the production step (AD). Control valve 17 logic determines when product gas from B enters the segregated product storage tank (18).

Step 6 (PP): During this time valve 34 is closed, and valve 9 remained opened, so that product gas is obtained from the segregated storage tank, in the order of increasing purity, for product pressurization of bed A. In the case of bed B, either the adsorption step is continued, wherein valves 6 and 35 remained opened, or valve 35 is closed to allow bed B to undergo a cocurrent depressurization step. For either of the two cases, additional product gas is sent to the segregated product storage tank 18.

Based on the cycle described above in relation to FIGS. 1 and 2, several modifications can be made to alter one or more of the steps without deviating from the scope of the invention. For example, the feed and product pressurization steps can occur simultaneously, rather than sequentially as described above. Also, the countercurrent depressurization step can be preceded by opening to air until the pressure in the bed dropped to 1.0 atm., before evacuation begins.

Figure 3:
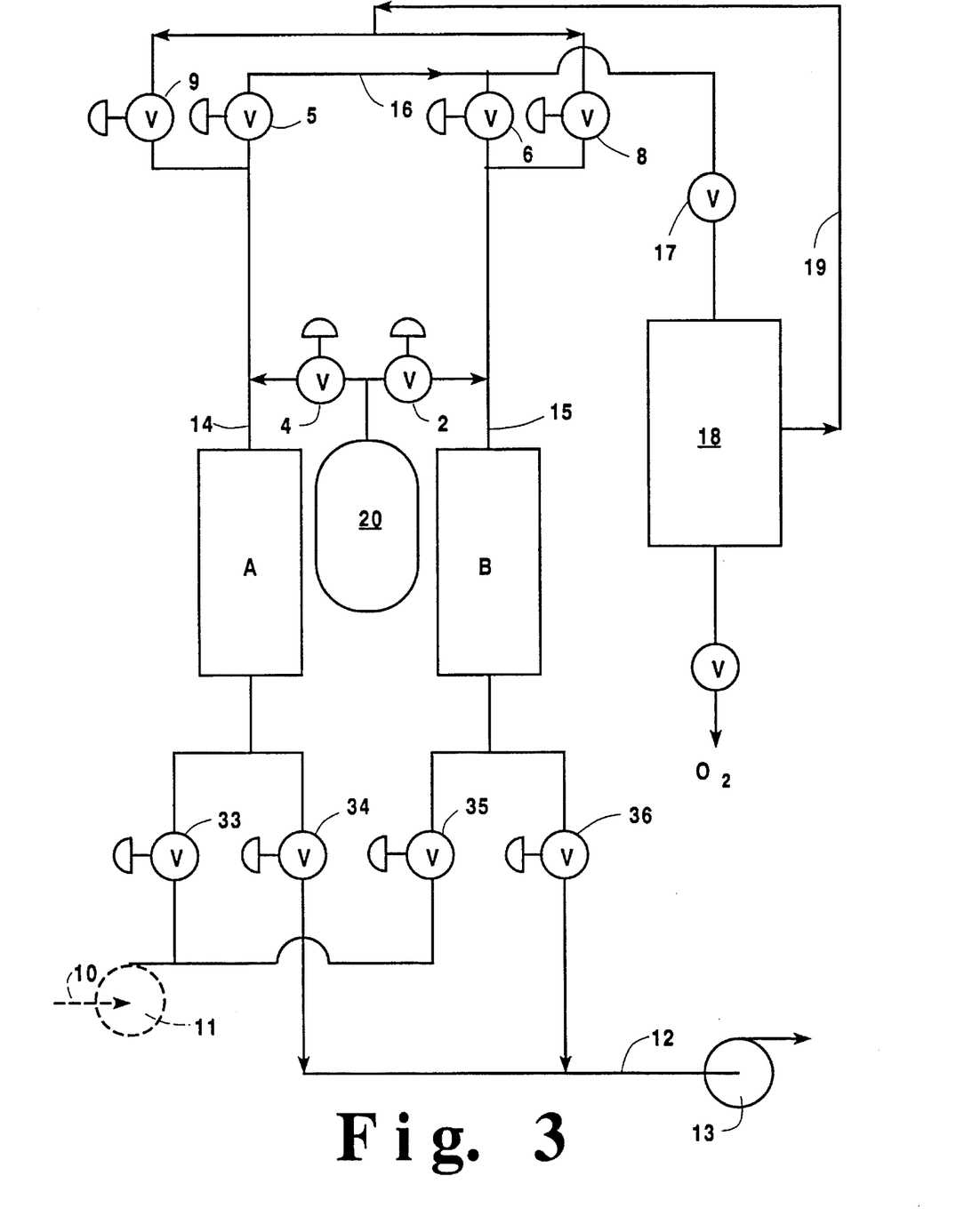
FIG. 3 is a process flow diagram of a two bed PSA system using two segregated gas storage tanks.

FIG. 3 of the drawings illustrates another embodiment in which a segregated product storage tank 18 and a segregated equalization tank 20 are employed in a system otherwise as shown in the FIG. 2 embodiment in which segregated product storage tank 18 is employed, but without use of a second external gas storage tank. It will be understood that the carrying out of the various processing steps, and the related opening and closing of valves, is generally similar to that described above with respect to the FIG. 2 embodiment. The use of the two segregated storage tanks 18 and 20 allows for greater flexibility in the carrying out of the PSA-gas separation process. For example, the individual steps in the PSA cycle do not have to be carried out for fixed periods of time in the FIG. 3 embodiment. Thus, physical variables, such as pressure and composition, can be readily used to determine the desired time allocated to each step, thereby adjusting the process for changes in temperature, pressure and variable product demand. In this embodiment, all of the pressure equalization-falling gas can conveniently be directed to the segregated pressure equalization tank 20. It is particularly pointed out that in the practice of various embodiments of the invention, no direct bed-to-bed flow of gas is employed, and all of the reflux gas is passed to a bed undergoing regeneration in an order of increasing purity, starting with the lowest purity gas at the beginning of the step. In addition, since no direct bed-to-bed flow is employed, it is possible to operate each adsorbent bed independently, with the overall PSA process being treated as a collection of single bed units. It will be appreciated that for proper sizing and sharing of compressor(s) and vacuum pump(s), however, some synchronization of the overall cycle in each bed with the corresponding cycles in other beds in the system is necessary or desirable.

In another embodiment, segregated equalization tank 20 of the FIG. 3 embodiment can be eliminated from the system, and all of the pressure equalization-falling gas can be passed directly from one bed to another. However, during such direct bed-to-bed pressure equalization step, the bed undergoing the pressure equalization-rising step receives product gas of decreasing purity, although, in preferred embodiments, it is desirable that the bed receive product gas of increasing purity. Upon completion of the pressure equalization-rising step, the bed is further pressurized with gas from the segregated product storage tank 18, or it undergoes feed pressurization, or product gas and feed gas repressurization simultaneously.

Although the invention has been described above particularly with respect to the use of a single segregated product storage tank 18, it is within the scope of the invention to employ multiple segregated product storage tanks, wherein the effluent gas from a bed is directed to respective tanks at different times in the make product step. Likewise, the invention is not restricted to the use of cylindrical adsorbent beds with shallow dished heads at the top and bottom of the adsorbent vessel, with gas flow in the axial direction, and other desired bed configurations can also be used. For example, radial beds may be used to achieve a reduction in pressure losses, with concomitant reduction in power consumption. In addition, layered beds can be used with different adsorbents packed at various positions within the bed. For example, activated alumina can be placed at the feed end of the bed to remove water and carbon dioxide from the feed stream, with LiX zeolite adsorbent being placed on top of the activated alumina to perform the separation, for example, of feed air into an oxygen-enriched product gas comprising the less readily adsorbable component of said feed air.

Figure 4:
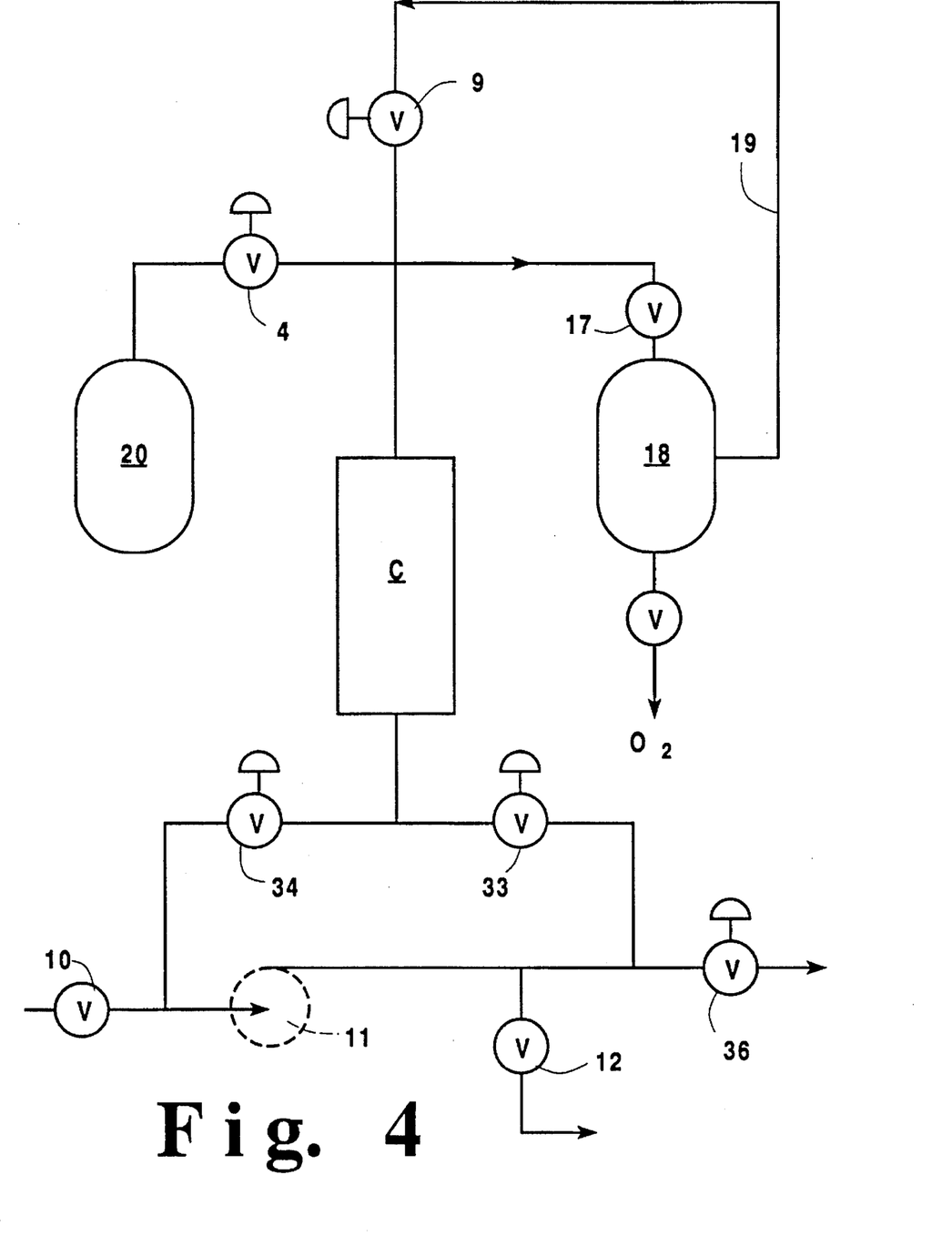
FIG. 4 is a process flow diagram of a single bed PSA system using two segregated external gas storage tanks.

FIG. 4 of the drawings illustrate a single adsorbent bed C embodiment of the invention in which separate segregated storage are employed, i.e., product tank 18 and equalization tank 20. In order to achieve high machine utilization in this embodiment, a single compressor/blower is used to perform the pressurization and evacuation steps of the process. The operating steps of the PSA process as carried out in the FIG. 4 embodiment are as set forth below, The cycle is considered as beginning after product pressurization. In this step (FP), valves 10 and 33 are opened, and the other valves are closed. Valve 17 is a differential pressure check valve that opens only when the pressure in the adsorbent vessel becomes greater than the pressure in the segregated product storage tank 18. After feed pressurization, step 2 (AD) begins. During step 2 the make product step, valves 10 and 33 remained opened, and the differential check valve 17 opens when the pressure in the adsorbent vessel exceeds the pressure in the segregated product storage tank 18. Upon the opening of valve 17, product gas enters the segregated product storage tank 18. At the end of step 2, valve 33 is closed, and valve 36 opened to unload the compressor. During this time, the bed undergoes cocurrent depressurization with valve 4 in the opened position to collect the void gas into the segregated equalization tank 20. Note that the check valve 17 will be in the closed position during the cocurrent depressurization step (step 3), since the pressure of the adsorbent bed C will fall below that of the segregated product tank 18. During step 3 execution, valves 9, 10, and 33 are in the closed positions. Upon the termination of step 3, valves 12 and 34 are closed. During this step (step 4 or EV), gas in the adsorbent vessel leaves via valve 34 and enters through the inlet of the compressor. The next step (step 5 or PG), depicted in FIG. 1 is the purge step. During this step, valves 4, 34 and 12 are opened, and the gas from the segregated equalization tank (20), supplies product gas, in the order of increasing purity, to purge the adsorbent bed C. The final step (step 6), product pressurization, is then executed with valves 12 and 34 closed while valve 4 remains in the opened position. If additional product gas is required for product pressurization, then valve 4 is closed, and valve 9 is opened to complete the product pressurization step.

It will be understood the various modifications of the single bed process can be readily made without departing from the scope of the invention as recited in the appended claims.

EXAMPLE 1

In an illustrative example of the practice of the invention the processing steps of FIG. 1 are employed using the two-bed PSA system of FIG. 2. In the example, reflux gas purity is initially relatively low, e.g., 85%, and increases to about 93% over a period of about 16 seconds. The symbols used below have the following meaning:

TPD=metric ton (1 ton=2,000 lb) per day of oxygen; KPa=1,000 Pa=S.I. unit for pressure (1.0 atm.=101.325 kPa); s=time unit in seconds; and kW=kilowatt The PSA process conditions and theoretical results obtained by computer simulation, are as follows:

| Adsorbent | Li—X zeolite |
| --- | --- |
| Cycle time | 72 sec |
| Upper adsorption pressure | 151.99 kPa |
| Lower adsorption pressure | 40.53 kPa |
| Pressure at the end of step 6 | 64.85 kPa |
| Feed rate | 233.19 NCFH |
| Product rate | 32.76 NCFH |
| Oxygen purity | 92.22% |
| Oxygen recovery | 66.89% |
| Bed size factor (BSF) | 663 $lb_m$/TPD $O_2$ |
| Power | 5.61 kw/TPD $O_2$ |

From this example, it will be seen that the two-bed PSA process advantageously produces high purity oxygen product, with high product recovery; low Bed Size Factor, i.e., the amount of adsorbent required to produce a given amount of product gas; and low power consumption.

EXAMPLE 2

Illustrative example 1 was repeated, for comparative purposes, with the segregated storage tank being replaced by a prior art storage tank, wherein mixing of the gas therein is unavoidable. In this comparative embodiment, a portion of the product gas removed from the product end of the bed during the adsorption-product recovery step at the upper adsorption/pressure is diverted to the storage tank to provide pressure equalization gas for the process, and an additional portion thereof is likewise diverted to said storage tank to provide purge gas for bed regeneration purposes. In this mode of operation, the purity vs. time profile has the opposite characteristic of that applicable in Example 1, i.e., the oxygen purity varies from an initial higher purity to a subsequent lower purity.

Computer simulated results for this comparative example are as follows:

| Adsorbent | Li—X zeolite |
| --- | --- |
| Cycle time | 70 sec |
| Upper adsorption pressure | 149.96 kPa |
| Lower adsorption pressure | 40.53 kPa |
| Pressure at the end of step 6 | 64.85 kPa |
| Feed rate | 233.19 NCFH |
| Product rate | 27.89 NCFH |
| Oxygen purity | 92.59% |
| Oxygen recovery | 56.96% |
| Bed size factor (BSF) | 736.36 $lb_m$/TPD $O_2$ |
| Power | 6.48 kW/TPD $O_2$ |

Upon comparing the results obtained in Example 1 with those of Example 2, it will be seen that, for comparable product purity, the incorporation of a segregated storage tank in the PSA system results in a lower bed size factor, i.e., about 8%, and a lower power consumption, i.e., about 12%, when compared to the same PSA processing cycle with the use of a conventional external storage tank. In addition, the incorporation of the segregated storage tank serves to reverse the product purity order of the refluxing (purge) gas. For example, in the practice of the prior art, the highest purity product is used at the beginning of the refluxing step, followed by the use of lower purity purge gas. However, in the practice of the invention, the segregated storage tank enables the product gas to be stored unmixed. When reflux gas is needed, it is removed from the segregated storage tank in an order of increasing purity, with the lowest purity gas being used first, followed by higher purity gas. At the end of the refluxing step, the highest purity gas was used, and the product end of the bed has the least contamination with the more readily adsorbable component gas. Consequently, during the subsequent production step, higher purity product can be produced, or longer processing time can be allocated for the product production step to achieve a desired purity level.

Those skilled in the art will appreciate that various changes and modifications can be made in the details of the invention as herein described without departing from the scope of the invention as hereinafter claimed. For example, it will be understood that product gas of varying purity can be used not only for refluxing, but portions thereof can also be withdrawn from the process and system as lower purity product gas passed to one or more downstream applications. As will also be understood, the portion of the product gas of varying purity used as reflux gas can be used solely for the pressure equalization-rising step in a bed, or can be used for both purge and said pressure equalization rising, or can be used for said pressure equalization-rising step together with product repressurization, with or without use of a portion of said product gas also being used for purge purposes. In any event, as noted above, the product gas is passed to and from the segregated gas storage tank(s), with no passage of said product gas directly from one bed to another as in conventional operations.

It is also within the scope of the invention to practice the subject invention in a variety of adsorption systems, using a variety of PSA processing sequences, including two or more stage systems in which separate adsorbent beds are used to selectively adsorb different components of a feed gas mixture. In feed air separation systems, for example, two or more adsorbent stages may be employed, with the adsorbent bed or beds in one stage being adapted to selectively adsorb nitrogen as the more selectively adsorbed component, and with the adsorbent bed or beds in another stage being adapted to selectively adsorb oxygen as the more selectively adsorbed component of the feed air. As will be appreciated by those skilled in the art, molecular sieves such as 5A and 13X material are commonly employed adsorbents for the selective adsorption of nitrogen from feed air, while activated carbon adsorbents are commonly used to selectively adsorb oxygen from feed air.

Those skilled in the art will appreciate that, in embodiments of the invention in which gas of high purity is passed from the external, segregated gas storage tank of the invention to the product end of an adsorbent bed as part of the bed refluxing operation following the pressure equalization step, the adsorbent bed pressure obtained thereby will be somewhat less than the desired upper adsorption pressure. Final repressurization to the upper adsorption pressure will be achieved upon the addition of feed gas to the feed end of the bed at the desired adsorption pressure.

The invention thus represents a significant advance in the PSA field. The reduction in Bed Size Factor and the reduction in the power requirements of a desired PSA gas separation operation obtainable in the practice of the invention enhances the ability of the desirable PSA technology to satisfy the ever growing needs for the separation operations in a wide variety of commercial applications.

What is claimed is:

1. In a pressure swing adsorption process for the separation of a less readily adsorbable component of a feed gas mixture from a more readily adsorbable component thereof, in an adsorption system comprising one or more adsorbent beds containing adsorbent material capable of selectively adsorbing said more readily adsorbable component from the feed gas mixture, said process including in each adsorbent bed, a cyclic processing sequence comprising the following steps: (a) passing the feed gas mixture to the feed end of the adsorbent bed at an upper adsorption pressure with the selective adsorption of the more readily adsorbable component from the feed gas mixture and the recovery of the less readily adsorbable component as product gas from the product end thereof; (b) cocurrent depressurization of the adsorbent bed from the upper adsorption pressure to an intermediate pressure, with removal of additional quantities of product gas comprising the less readily adsorbable component from said product end of the adsorbent bed; (c) countercurrent depressurization of the adsorbent bed from said intermediate pressure to a lower desorption pressure, with desorption and removal of the more readily adsorbable component from the feed end of the adsorbent bed; (d) passage of product gas comprising less readily adsorbable component to the product end of the adsorbent bed to increase the pressure thereof from said lower desorption pressure to an intermediate pressure; and (e) passage of feed gas mixture to the feed end of the adsorbent bed to increase the pressure thereof from said intermediate pressure to said upper adsorption pressure, the improvement comprising, (1) in step (b) above, passing at least some of said product gas comprising the less readily adsorbable component removed from the product end of the adsorbent bed to one or more external, segregated gas storage tank(s) adapted for precluding mixing of gas passed thereto, said product gas passed to said external, segregated gas storage tank(s) being initially of higher purity, followed by lower purity product gas, without passage of any of said product gas directly from one adsorbent bed to another bed in the adsorption system, and (2) in step (d) above, passing said product gas from said external, segregated gas storage tank(s) to the product end of an adsorbent bed initially at the lower desorption pressure for repressurization to an intermediate pressure with product gas of lower purity being initially passed from said external segregated gas storage tank(s), followed by product gas of higher purity, the adsorbent bed thereby having product gas of increasingly higher purity therein at the product end thereof, whereby higher purity product gas can be produced and/or high product recovery, low bed size factor and low power consumption can be achieved.

2. The process of claim 1 in which said feed gas mixture comprises feed air, and said adsorbent material is capable of selectively adsorbing nitrogen as the more readily adsorbable component of said feed air, with oxygen comprising the less readily adsorbable component of the feed air.

3. The process of claim 1 in which said product gas is passed, in said step (1), to a single external, segregated gas storage tank.

4. The process of claim 1 in which said product gas is passed, in said step (1) to two external, segregated gas storage tanks.

5. The process of claim 1 and including passing product gas, in said step (2) from said external, segregated gas storage tank(s) to the product end of an adsorbent bed at the lower desorption pressure for passage therethrough at increasing purity as purge gas to facilitate removal of the more readily adsorbable component from the feed end of the adsorbent bed.

6. The process of claim 5 in which said product gas is passed, in said step (1) to two external, segregated gas storage tanks.

7. The process of claim 6 in which said feed gas mixture comprises feed air, and said adsorbent material is capable of selectively adsorbing nitrogen, as the more readily adsorbable component, from said feed air, with oxygen comprising the less readily adsorbable component of said feed air.

8. The process of claim 1 and including passing product gas, in said step (2), from said external, segregated storage tank(s) at increasing purity to the product end of an adsorbent bed, initially at said intermediate pressure to increase the pressure thereof to the upper adsorbent pressure.

9. The process of claim 1 in which said steps (a) and (e) include a combined step of passing the feed gas mixture to the feed end of the adsorbent bed at a rate such that the more readily adsorbable component is selectively adsorbed therefrom, the pressure of the adsorbent bed is increased from intermediate pressure to said upper adsorption pressure, and the less readily adsorbable component is recovered from the product end of the bed.

10. In a pressure swing adsorption system for the separation of a less readily adsorbable component of a feed gas mixture from a more readily adsorbable component, in an adsorption system comprising one or more adsorbent beds containing adsorbent material capable of selectively adsorbing said more readily adsorbable component from the feed gas mixture, said adsorption system comprising the following additional elements: (a) conduit means for passing feed gas to the feed end of each said adsorbent bed at an upper adsorption pressure; (b) conduit means fur passing product gas comprising said less readily adsorbable component from the product end of the each said adsorbent bed at the upper adsorption pressure; (c) conduit means for passing additional quantities of product gas comprising the less readily adsorbable component from the product end of each said adsorbent bed for use in the repressurization of an adsorbent bed initially at a lower desorption pressure, thereby decreasing the pressure thereof from said upper adsorption pressure to an intermediate pressure; (d) conduit means for removing the more readily adsorbable component from the feed end of each said adsorbent bed, so as to decrease thereby decreasing the pressure thereof from said intermediate pressure to a lower desorption pressure; (e) conduit means for passing product gas to the product end of each said adsorbent bed to increase the pressure thereof from said lower desorption pressure to an intermediate pressure, and for passing the feed gas mixture to the feed end of each said adsorbent bed to increase the pressure thereof from said intermediate pressure to said upper adsorption pressure, the improvement comprising: (1) said conduit means of element (b) above comprising conduit means for passing at least some of said product gas to one or more external, segregated gas storage tanks adapted for precluding mixing of the gas passed thereto, said product gas being initially of higher purity, followed by lower purity void space gas, without any such conduit means for passage of product gas directly from one adsorbent bed to another adsorbent bed in the adsorption system; and (2) conduit means for passing product gas from said external, segregated gas storage tank(s) to the product end of each said adsorbent bed, initially at the lower desorption pressure, for repressurization to an intermediate pressure, said conduit means being adapted to initially pass said product gas of lower purity from the external segregated gas storage tank(s) followed by product gas of higher purity, the product end of said adsorbent bed initially at lower pressure, thereby having product gas of increasingly higher purity therein, whereby higher purity product gas can be produced and/or high product recovery, low bed size factor and low power consumption can be achieved.

11. The system of claim 10 in which said system comprises a single, segregated gas storage tank.

12. The system of claim 10 in which said system comprises two external, segregated gas storage tanks.

13. The system of claim 10 in which, in (2), said conduit means are also being adapted for initially passing product gas at increasing purity from said external, segregated gas storage tank(s) to the product end of each said adsorbent bed at the lower desorption pressure for passage therethrough as purge gas.

14. The system of claim 10 in which, in (2), said conduit means are also being adapted for passing product gas at increasing purity from said external segregated gas storage tank(s) to the product end of each said adsorbent bed to increase the pressure thereof from said intermediate pressure to said upper adsorption pressure.

15. The system of claim 10 in which, in (2), said conduit means comprise conduit means for passing said product gas at increasing purity from said external, segregated gas storage tank(s) to the product end of each said adsorbent bed initially at the lower desorption pressure (a) for passage therethrough at the lower desorption pressure as purge gas and (b) to increase the pressure thereof from the lower desorption pressure to said intermediate pressure.

16. The system of claim 10 in which said adsorption system comprises one adsorbent bed.

17. The system of claim 10 in which said adsorption system comprises two adsorbent beds.

18. The system of claim 10 in which elements (a) and (e) comprises conduit means for passing the feed gas mixture to the feed end of each said adsorbent bed at a rate such that the more readily adsorbable component is selectively adsorbed therefrom, the pressure of the adsorbent bed is increased from intermediate pressure to said upper adsorption pressure, and the less readily adsorbable component is recovered from the product end of the bed.

19. The system of claim 10 in which, in (2), said conduit means are also being adapted for passing product gas at increasing purity from said external segregated gas storage tank(s) to the product end of each said adsorbent bed initially at said intermediate pressure to increase the pressure thereof to an upper intermediate pressure.

* * * * *